UNITED STATES PATENT OFFICE.

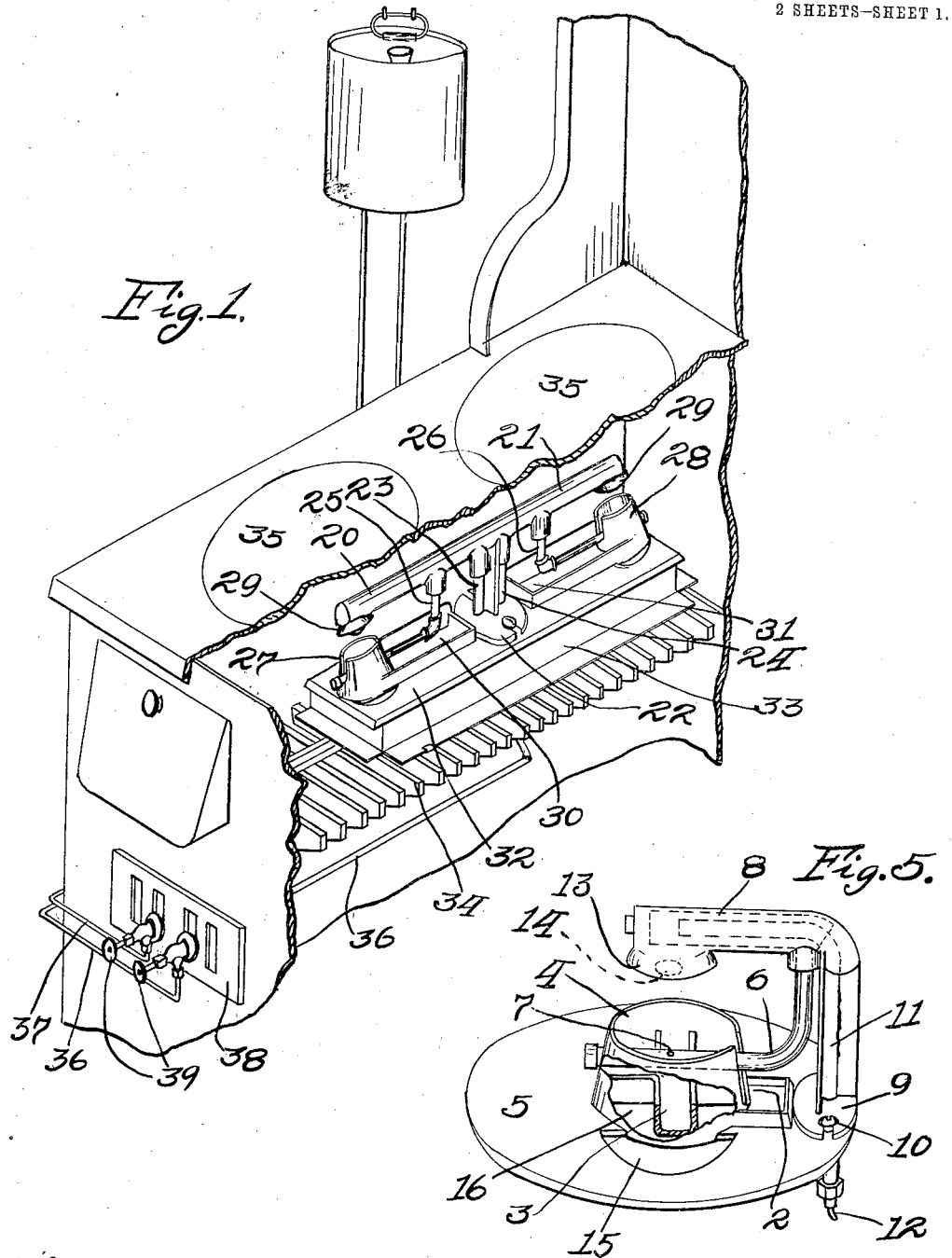

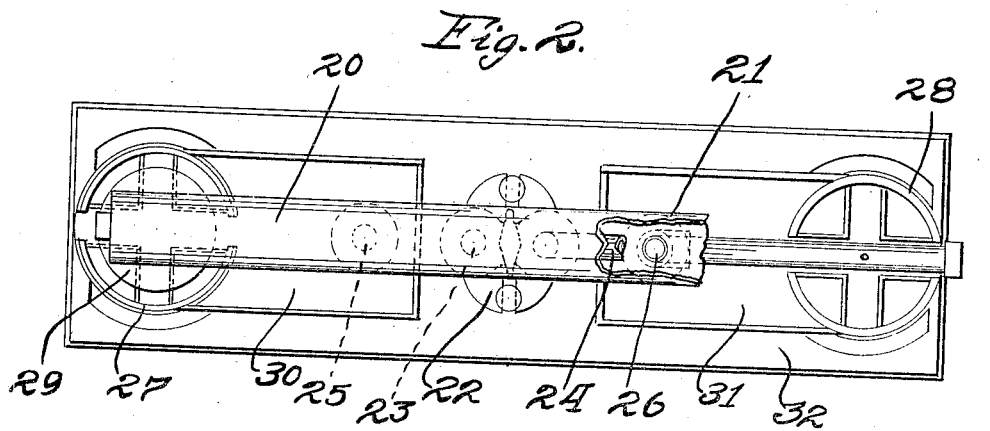
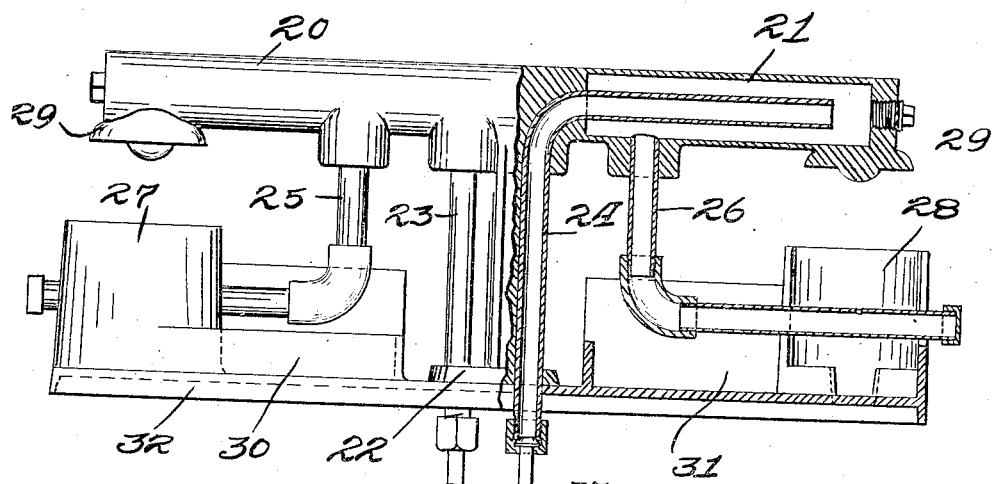
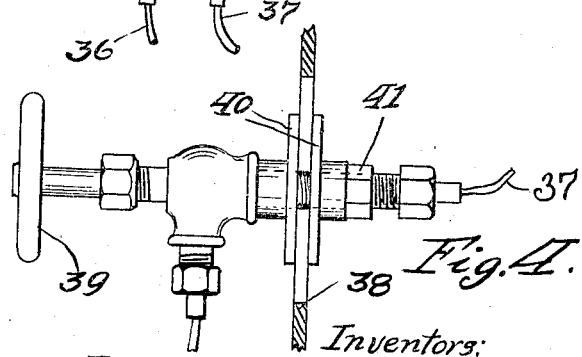

BENJAMIN J. MILLER AND WILBUR F. DAY, OF ST. PAUL, MINNESOTA.

KEROSENE-GAS BURNER.

1,119,096.

Specification of Letters Patent.

Patented Dec. 1, 1914.

Application filed July 20, 1914. Serial No. 851,942.

*To all whom it may concern:*

Be it known that we, BENJAMIN J. MILLER and WILBUR F. DAY, citizens of the United States, residing at St. Paul, in the county of Ramsey and State of Minnesota, have invented new and useful Improvements in Kerosene-Gas Burners, of which the following is a specification.

Our invention relates to improvements in kerosene gas burners, and its primary object is to provide means for completely vaporizing and gasifying kerosene and other heavy or light fuel oil.

Another object is the provision of a burner which will economically and effectively convert kerosene or crude oil into gas and prevent condensate from clogging the passages in the burner.

A further object is the construction of a burner which is applicable for use in connection with a coal stove when so desired.

In the accompanying drawings forming part of this specification, Figure 1 is a perspective of our invention when applied for use in connection with a coal stove, a portion of the stove being illustrated; Fig. 2 is a plan of the burner partly broken away and in section; Fig. 3 is a side view, half in elevation and half in section, of the burner. Fig. 4 is a side elevation partly in section of the draft plate and fuel supply means attached to said plate, and Fig. 5 is a perspective of our invention when constructed with one burner, partly broken away.

In the drawings with which we have illustrated our invention the burner is shown when of single or double form. A single form of burner consists of an air and gas mixing chamber 2, having starting pan 3, across its lower portion. The mixing chamber 2 is formed by an upwardly and inwardly tapering wall 4, integral with a supporting plate 5 of which the pan is also an integral part. The space within the pan 3 connects with the space within the inclosing wall 4, said pan being provided for the purpose of holding ashes upon which oil can be placed and ignited for heating the generator 8 to be hereinafter described. A gas supply pipe 6 extending across the chamber 2 has a vent opening 7 positioned centrally within said chamber. The pipe 6 extends upwardly from without the chamber 2 and is connected with said laterally extending generator 8, which projects from one side to a point immediately above the mixing chamber 2. The generator 8 is supported by a stand 9, which is secured to the base 5, such as by screws 10, said stand being formed with a duct 11 leading from a supply tube 12 up into and projecting near the inner extremity of the generator 8, so that the oil or fuel to be gasified and refined is delivered near the inner end of the generator directly over the hottest part of the flame issuing from above the mixing chamber 2. The portion of the generator immediately above the mixing chamber 2 is formed with a depending circular shaped spreader for transmitting a portion of the heat from the flame to the generator and forming the flame into a ring. The central inner portion of the spreader 13 is formed with a downwardly extending protuberance 14, which also assists in spreading the flame and reducing noise. In operation air is admitted around and into the mixing chamber 2 by means of the air passages 15 and 16 lying respectively adjacent the outer and inner surfaces of the wall 4 and by the space below the wall issuing from the pan 3. As the liquid fuel such as kerosene, distillate or crude petroleum is admitted into the generator the heat issuing from above the mixing chamber 2 increases the temperature of the walls of the generator, thus converting the liquid fuel into gas and leaving little or no condensate, said gas passing down through the pipe 6 and entering the mixing chamber 2 through the passage 7. In this chamber 2 the gas is mixed with air and consumed above. Any condensate which collects during the process of starting the burner drops into the pan where it is caught among the ashes which have been previously placed therein and either consumed or held until the contents of the pan are removed. It will be noted that the course of the fuel after being admitted into the hot generator 8 is in a downward direction, thus forming a very effective and simple means for converting the fuel into gas, the vaporization being normally complete. To start the burner combustible oil is placed on the ashes in the pan and ignited and heat from the oil raises the temperature of the walls of the generator, thus converting the fuel admitted into the generator into gas.

The construction is susceptible of various modifications within the scope of our invention; Figs. 2 and 3 illustrating one form in which the burner is made double instead of single. In the double construction the generator is formed with two branches 20 and 21 extending from a single support or stand 22, through which supply ducts 23 and 24 extend upwardly and into the branches in the same manner as in the single form of construction. The gas passages 25 and 26 are connected with the generator chambers and lead across mixing chambers 27 and 28 in a similar manner as in the preferred form. The deflectors 29 of substantially the same construction as in the single form are also provided above the mixing chambers. The parts of the device together with the pans 30 and 31 are also constructed integral with a base 32. This device is particularly adapted for use in a cook stove or range, it being feasible to place the same with its stand resting upon a false bottom 33 in the fire pot on the grate 34. In this condition the burners are adapted to be positioned below a pair of the lids 35 on the top of the stove and the oil supply pipes 36 and 37 are adapted to be led into the stove through the openings in the draft plate 38. Each of the pipes 36 and 37 is adapted to be connected with one of the ducts 23 or 24, and is provided with a valve such as 39 positioned outside of the stove and secured to the draft plate by a pair of washers such as 40 and a lock nut 41. In use the grate is covered around the burner by ashes or other suitable material so that all air must pass up through the air ducts in the device.

In accordance with the patent statutes, we have described the principles of operation of our invention, together with the apparatus which we now consider to represent the best embodiment thereof, but we desire to have it understood that the construction shown is only illustrative and that the invention can be carried out by other means and applied to uses other than those above set forth within the scope of the following claims.

Having described our invention, what we claim as new and desire to protect by Letters Patent is:—

1. In a gas generator, an air and gas mixing chamber, a gas generator, a fuel supply pipe delivering into said generator at a point substantially above said mixing chamber, a pipe opening into said generator at a point remote from the delivery end of said supply pipe forming a passage-way from said generator to said mixing chamber, and a receptacle associated with said mixing chamber, adapted to receive and retain liquid fuel.

2. A kerosene gas generator, comprising, in combination, a base, a standard mounted upon said base having a pair of outwardly spreading retort chambers, an air mixing chamber positioned immediately below the outer end of each of said generators, a fuel supply duct leading upwardly into each of said generators and emptying into the hottest part thereof immediately above the coöperating mixing chamber and a downwardly extending gas conducting tube leading from the inner end of each of said generators and extending outwardly across and formed with an outlet into the coöperating mixing chamber.

3. In combination with a stove having a grate and draft plate therein and removable lids in its top, a base, an air and gas mixing chamber on said base, a gas generator having a chamber extending from one side over said mixing chamber, a gas conducting tube extending downwardly from the portion of said generating chamber away from said air and gas mixing chamber and having an orifice in its lower portion positioned within said air and gas mixing chamber, a fuel supply pipe extending from a point in said generating chamber immediately above said mixing chamber downwardly and out of said stove through said draft plate, a valve in said supply pipe outside of said stove and means for fastening said supply pipe and its valve to said draft plate.

4. A gas generator for kerosene and other heavy fuel liquids, comprising, in combination, a base having a wall projecting upwardly and forming an air and gas mixing chamber, said base having openings inside and outside of said wall for admitting air upwardly to mix with gas in said chamber and a gas generator superimposed over said mixing chamber having a duct for supplying fuel terminating in a tubular projection extending longitudinally in said generator and opening thereinto at a point near the hottest part of said generator above said mixing chamber, a deflector on said generator immediately above said mixing chamber having a downwardly projecting centrally disposed protuberance adapted to spread the flame issuing from said mixing chamber outwardly, and a duct leading downwardly from the outer end of said generator and across and into said mixing chamber for conducting gas from said generator down into said mixing chamber.

In witness whereof, we have signed our names to this specification, in the presence of two subscribing witnesses.

BENJAMIN J. MILLER.
WILBUR F. DAY.

Witnesses:
STELLA L. WASCHENBERGER,
F. G. BRADBURY.